Figures 1, 2:
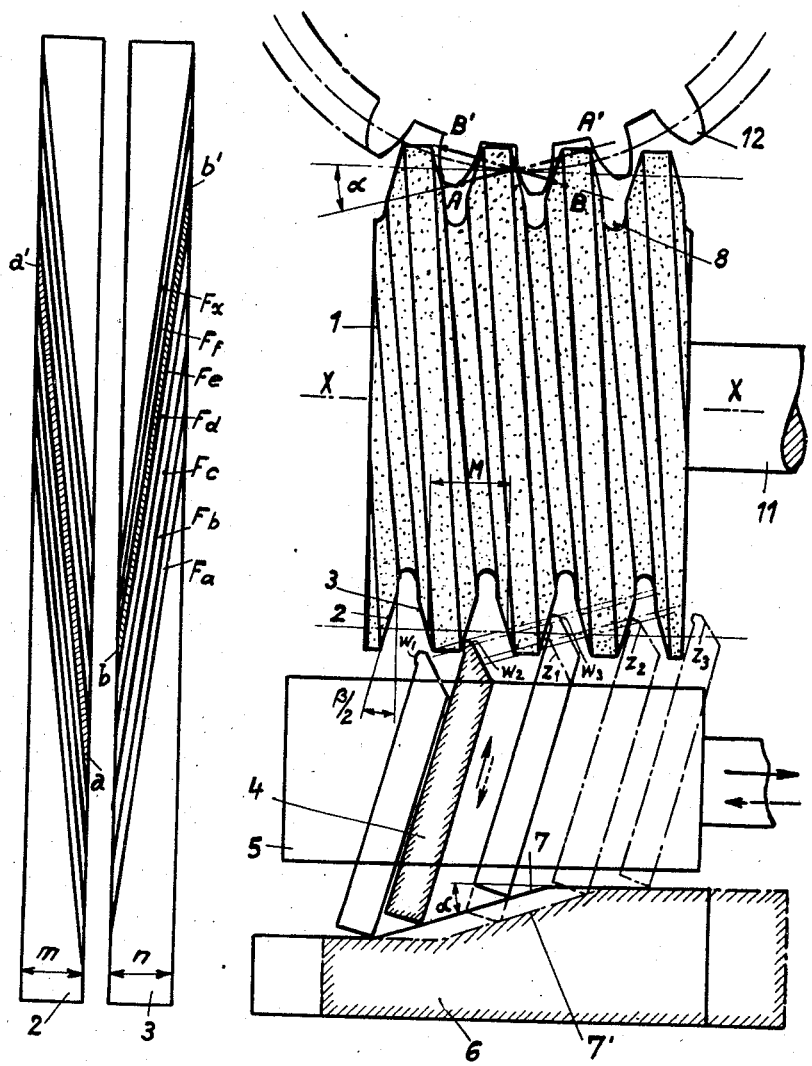

Oct. 24, 1939. A. RICKENMANN 2,177,583
TRUING DEVICE FOR ABRASIVE WORMS
Filed March 11, 1939

Inventor
Alfred Rickenmann
By B. Singer, Atty

Patented Oct. 24, 1939

2,177,583

UNITED STATES PATENT OFFICE 2,177,583

TRUING DEVICE FOR ABRASIVE WORMS

Alfred Rickenmann, Zurich, Switzerland

Application March 11, 1939, Serial No. 261,298
In Germany October 22, 1937

2 Claims. (Cl. 125—11)

The grinding of toothed wheels with involute gear teeth by means of spiral shaped grinding worms is already known. There are also known various methods for truing these grinding tools. As truing tools there serve diamonds, pressure rollers or rotating truing tools, for example grinding discs. When using diamonds, the tooth profile, in one known method, is produced in a similar manner to the procedure when grinding screw threads on a lathe, that is to say the truing tool runs parallel to the axis of the grinding disc and after each operation the tool is set deeper. In the pressing roller method, roller tools are used having a negative tooth profile for shaping the grinding worm. The pressure roller is pressed against the rotating grinding disc and rotated by the latter so that the disc and the pressing roller rotate at the same or approximately the same peripheral speed; in this case there is imparted simultaneously to the pressing roller an axial movement corresponding with the pitch of the pattern. Also when using rotary truing tools, for example grinding discs, the latter, in a similar manner as in the known screw thread grinding, are moved axially along the grinding worm to be trued according to the pitch.

In all known methods the grinding tools are guided parallel to the axis of the grinding worm.

All known truing methods have the disadvantage that sufficient accuracy as required under present day conditions can only be obtained with difficulty and with a considerable consumption of time.

According to the present invention these disadvantages are eliminated in that the truing tool is guided at an angle, of the amount of the engaging angle to the axis of the worm; it thus describes a line which according to the engaging angle extends at an angle to the axis of the grinding worm. The actuation of the truing tool may, according to the invention, be effected by a straight guide surface of a guide rail guided along a straight line. It is thus possible to use guide elements which are very simple and capable of being adjusted and produced accurately, whereby the method itself becomes accurate and simple.

When considering the method of operation of a grinding worm it will be seen that not the entire surface of the tooth flank of the grinding worm operates. Theoretically the grinding operation is effected by a line A—A' which extends on each flank side in the form of a spiral. These lines correspond with the so-called engaging lines and/or the straight line generating lines forming the basis of the involute teeth.

In Fig. 1 of the accompanying drawing, these lines for example are indicated by A—A' and B—B'. In practice these lines, in consequence of the grinding operation become effective as narrow band surfaces $F_a$ to $F_x$.

In Fig. 2 of the accompanying drawing, the flank surfaces 2 and 3 are shown developed. The surface parts $F_a$ to $F_x$ which come into operation at any time each extend as a narrow band at an angle over the flank surface.

The position of the operative band surfaces $F_a$ to $F_x$ depends on the axial position of the grinding worm 1 relatively to the wheel 12 to be ground. By axial movement of the grinding worm 1 relatively to the wheel 12 the operative band surfaces can be displaced on the grinding worm flank 2, 3, whereby it becomes possible to utilise economically the entire operative surface of the grinding worm.

The accuracy of the tooth profile of the grinding toothed wheel 12 is directly dependent on the accuracy of the line $a, a', b, b'$, etc., on the grinding worm flank which comes into operation. Deviations from the straight lines A—A' or B—B' produce deviations from the theoretical shape of the tooth profile.

With the truing method above described it is not possible up to the present time to produce the desired accuracy and/or straightness of the operative engaging lines.

The present invention resides therein that each of the operative bands or lines $F_a$ to $F_x$ of the grinding worm flank is produced in a single operation. For the shaping of these bands $F_a$ to $F_x$ there are preferably used truing tools of which the effective width is considerably smaller than the width $m$, $n$ of the flank 2, 3. For positively guiding the truing tool there may be used the device shown diagrammatically in Fig. 1. The grinding worm 1 is provided with the two flanks 2 and 3. The profile angle $\beta/2$ corresponds with the engaging angle $\alpha$. The truing tool 4, which for example may be a diamond, is guided in a guide of a slide 5 without clearance. The slide 5 is mounted in fixed guides and during the operation is moved, according to the pitch M of the grinding worm 1 parallel to the axis X—X thereof. Adjacent the slide 5 is located a guide rail 6 with the guide surface 7 for the truing tool 4. The guide surface 7' is not at right angles to the direction of movement of the slide 5 but is located at the angle $\alpha$ to the axis X—X of the grinding worm. The angle $\alpha$ is equal to the engaging angle. During the movement of the slide 5, which as stated is parallel to the axis X—X, the truing tool 4 is moved radially by the guide surface 7. The ratio of the axial and radial movements of the truing tool 4 is so selected that the truing tool 4 is guided exactly parallel along the engaging line A—A' and B—B' in Fig. 1.

The guide rail 6 may be secured at a predetermined engaging angle or may be made adjustable by means of a scale. During the axial movement of the slide 5 the guide rail 6 remains stationary. By periodically moving the guide rail 6, further band surfaces Fa to Fx of the grinding worm 1, located on the engaging lines a—a', b—b' are operated upon periodically. As shown in Fig. 2 a number of these operating surfaces Fa to Fx are located side by side on the flanks 2 and 3. W1 to W3 indicate various positions of the operating part of the truing tool 4, during a movement of the slide 5, the tool 4 successively occupies the positions Z1 and Z3 (chain-dotted positions) when the guide rail 6 is moved axially.

By this arrangement the movement of the truing tool 4 is controlled by a straight guide surface 7 of a guide rail 6 guided along a straight line. Guiding elements of this character are simple and capable of being produced and adjusted accurately.

The speed of rotation of the grinding worm 1, for the purpose of truing, is reduced to such an extent that an accurate operation free from shock is possible. The truing operation may be effected in one or both directions, in the latter case a change of direction of rotation of the grinding worm 1 is necessary.

In the drawing the parts are shown in their position for truing the flank 2. The flank 3 is trued in a similar manner. As truing tools there may be used diamonds, pressing rollers and rotating grinding discs. In the construction described and shown one tooth flank after the other is trued by the use of a truing tool.

It is also possible to use devices wherein each flank is operated upon simultaneously by a number of truing tools, the points of operation of the truing tools being displaced axially by the pitch M.

It is also possible to use truing devices wherein the guide for the truing tool 4 in the slide 5 does not extend at an angle corresponding with the engaging angle $\alpha$ but extends exactly at right angles to the direction of movement of the slide 5 whereby the ratio of the axial and radial movements of the truing tools must be so adjusted that the truing tool passes exactly over the engaging line of the grinding worm flanks.

It is not necessary to effect the profiling of the grinding worm from the start according to this method. The pre-shaping of the profile may also be effected in other ways, for example by means of pressing rollers, whereby a recess 8 of the worm profile may be provided so that the truing tool has an unobstructed opening. The grinding worm may also be cast as such with the pre-shaped profile.

I claim:

1. Means for truing worms for grinding involute teeth according to the spiral rolling method, said means comprising a truing tool having a cutting element, a slide movable parallel to the axis of the worm in synchronism with and according to the pitch of the worm, said tool being mounted in said slide for movement in the direction of its length with its axis inclined to the axis of the slide and worm to parallel the profile of the worm, and a guide rail held parallel to the axis of the slide and having an inclined guide surface engaged by said truing tool for controlling lengthwise movement of the tool.

2. The device of claim 1, including a plurality of truing tools mounted in said slide for truing the entire depth of the flank, said tools being relatively displaced according to the pitch of the grinding worm.

ALFRED RICKENMANN.